United States Patent Office 3,492,562
Patented Jan. 27, 1970

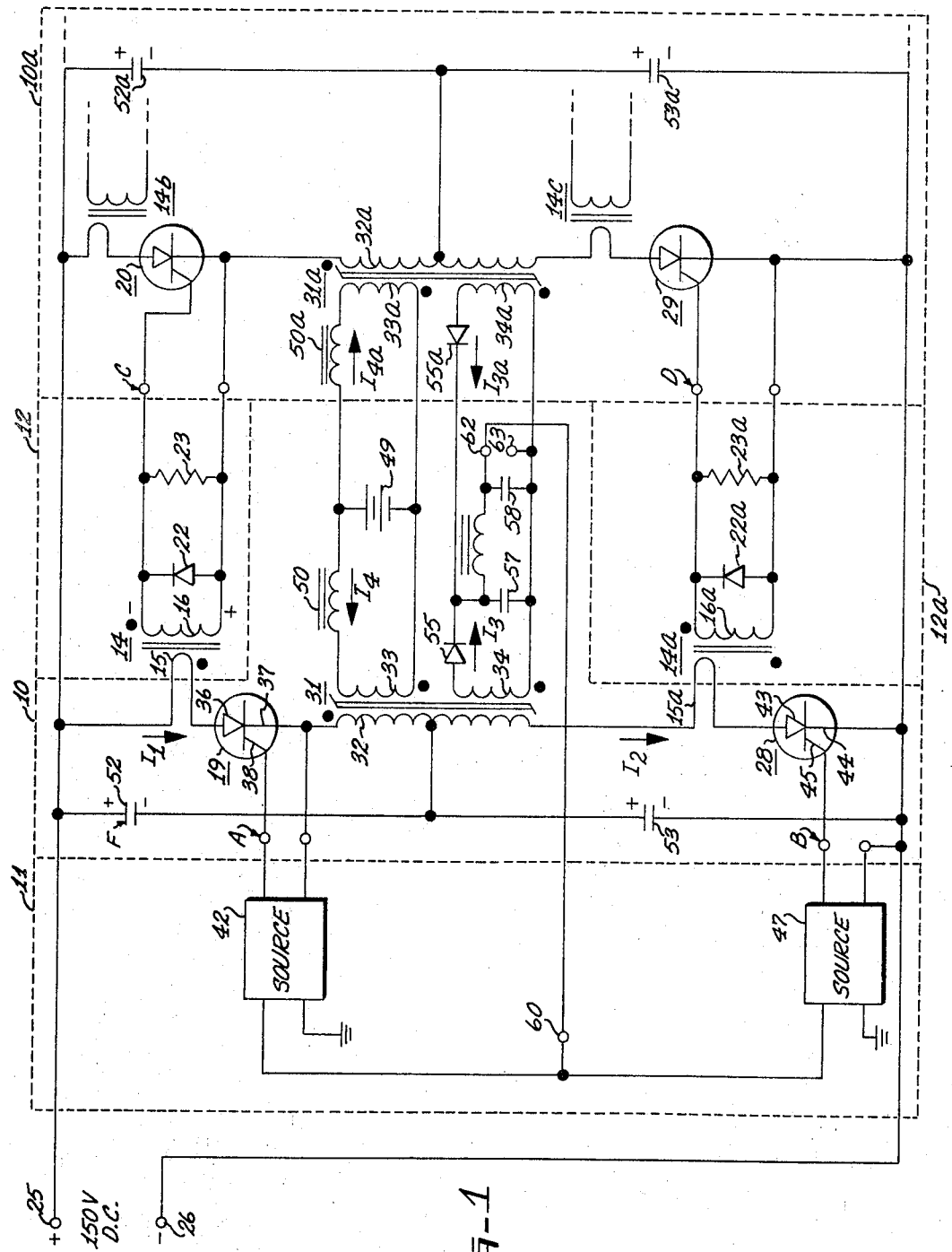

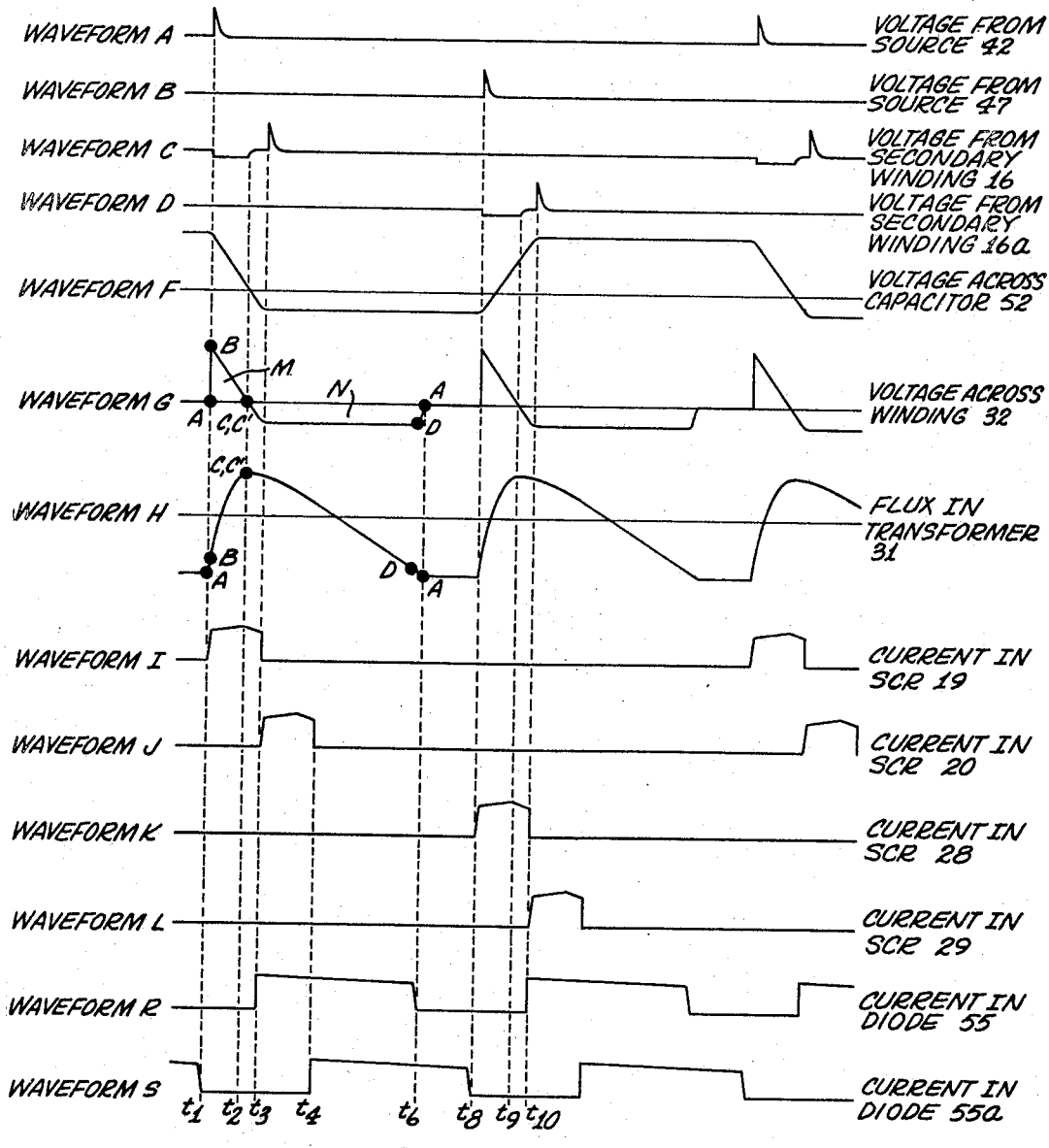

3,492,562
TRIGGER CIRCUIT FOR PROVIDING TANDEM OPERATION OF SWITCHING REGULATORS
Luther L. Genuit, Scottsdale, Ariz., assignor to General Electric Company, a corporation of New York
Filed Apr. 5, 1967, Ser. No. 628,660
Int. Cl. H02p 13/14, 13/16
U.S. Cl. 323—22     3 Claims

ABSTRACT OF THE DISCLOSURE

A trigger circuit provides tandem operation of first and second switching regulators. A signal source supplies positive trigger signals to a first silicon controlled rectifier of a first switching regulator. Each trigger signal causes the switching regulator to deliver a predetermined quantity of electrical energy to a filter capacitor. The signal source is connected to the filter capacitor and the voltage across the filter capacitor controls the frequency of the trigger signals so that the voltage across the filter capacitor is substantially constant. A trigger circuit connected between the first switching regulator and a second switching regulator senses the current in the first silicon controlled rectifier in the first switching regulator and supplies trigger pulses to a second silicon controlled rectifier in the second switching regulator. Each trigger pulse causes current to flow in the second silicon controlled rectifier immediately after current in the first silicon controlled rectifier terminates.

CROSS-REFERENCE TO RELATED APPLICATION

The switching regulator shown in the present application is disclosed in the United States patent application by Luther L. Genuit, filed Nov. 1, 1966, Ser. No. 591,204 now abandoned, entitled "Switching Regulator," which is assigned to the same assignee as the present invention.

BACKGROUND OF THE INVENTION

This invention relates to switching regulators and more particularly to trigger circuits which provide tandem operation of two or more switching regulators.

In high speed data processing systems, microcircuits are used to reduce the physical size of the system and to increase the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet using the discrete components when the two cabinets have the same physical size. In addition, high-speed microcircuits usually use a much smaller value of D.C. voltage than circuits employing discrete components. For example, in many high speed microcircuits the required D.C. voltage may be less than one volt. This voltage must be well regulated to provide a constant value of D.C. voltage for the microcircuits, otherwise variations in D.C. voltage may produce error signals in the data processing system.

The power supplied to any system is a product of the voltage and current so that a power distribution system must supply either a large value of current at a relatively small value of voltage or a smaller value of current at a relatively large value of voltage in order to provide a large amount of power. In prior art power supplies, power from a 220-volt A.C. line is converted into relatively small values of D.C. voltage and large amounts of current are distributed by large conductors or "bus" bars to various portions of the data processing system. The voltage drop at each bus bar is proportional to the amount of current in the bus bar so that the value of voltage supplied to each portion of the data processing system varies as the current supplied to that portion varies. This variation in voltage may produce error signals in the data processing system.

Another disadvantage of the prior art power supplies is that the efficiency of the supplies is very low. These power supplies usually include a constant voltage transformer and a rectifier which convert the A.C. voltage to a D.C. voltage, and a series regulator which reduces the D.C. voltage to a small but constant value. In such a system the voltage drop in the constant voltage transformer, the rectifier and the series regulator is usually about 5–6 volts while the output voltage necessary for the microelectronic circuits may be as low as 1 volt. This means that the power transformer must deliver approximately 6 to 7 times the power which is used by the microcircuit so that the overall efficiency of the power supply is less than 20% thereby causing the power supply to be bulky and expensive. Because of the large size, these power supplies are usually located in a separate cabinet and require long bus bars to distribute the current to other portions of the data processing system. These long bus bars cause severe variations in voltage when current in the bus bar varies. Still another disadvantage of the prior art power supplies is that an excessively large value of current drawn from the power supply can cause damage to the series regulator and other parts of the power supply, also a short circuit in the series regulator may cause a large value of voltage to be supplied to the microcircuit modules. This large value of voltage can cause damage to the microcircuit.

A power supply system employing switching regulators and switching regulator control circuits alleviates the disadvantages of the prior art by converting an A.C. voltage to a relatively large value of unregulated D.C. voltage. This D.C. is distributed at a relatively large voltage but low current to various portions of the data processing system thereby allowing the use of relatively small conductors. A "standby" power supply comprising a plurality of batteries can be employed to supply the relatively large value of D.C. voltage in the event of the failure of the voltage on the A.C. line. This relatively large value of unregulated D.C. voltage can be converted to a relatively small value of regulated D.C. voltage by switching regulators which are positioned at a plurality of locations in the data processing system. The switching regulator has an efficiency which is several times the efficiency of prior art power supplies employing series regulators thereby causing the physical size of the switching regulator to be relatively small and allowing the switching regulator to be positioned near the microcircuit modules.

The switching regulator may employ a transformer, a pair of silicon controlled rectifiers and a pair of signal sources to convert an unregulated D.C. voltage, such as 150 volts to an accurately regulated voltage, such as 1 volt. The silicon controlled rectifiers are employed as switches between the source of unregulated D.C. voltage and the transformer. The silicon controlled rectifiers are located on the "high" voltage side of the transformer where the current and the power losses in these rectifiers are low thereby causing the switching regulator to have a high degree of efficiency. The regulated D.C. voltage obtained from a secondary winding on the transformer is supplied to a pair of voltage output terminals. The transformer provides isolation between the regulated D.C. voltage and the source of unregulated D.C. voltage so that a short circuit in the silicon controlled rectifiers will not cause damage to the microcircuit modules which provide the load on the switching regulator. The silicon controlled rectifier is a semiconductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and the cathode when the pulse of current flows in the gate, the silicon controlled rectifier "fires"; i.e., is rendered conductive, and a current will flow from the anode to the cathode. The rate at which current flow from anode to cathode increases when the silicon controlled rectifier fires must be limited to prevent damage to the rectifier. Once anode-cathode flow commences, the gate has no further control over such current flow. Current flow from anode to cathode in the rectifier can be terminated only by reducing the anode to cathode current below a "holding" or minimum current value. A more detailed description of the operation of a silicon controlled rectifier can be found in the Silicon Controlled Rectifier Manual, third edition, 1964, published by the General Electric Company, Auburn, N.Y.

The pair of signal sources is coupled to the voltage output terminals and develops trigger signals whose frequency is determined by the value of voltage at the voltage output terminal. The trigger signals are coupled to the silicon controlled rectifiers and the switching regulator and cause these rectifiers to deliver energy through the transformer to the voltage output terminals. The signal sources sense any change in the value of the regulated output voltage and cause a change in the frequency of the trigger signals delivered to the switching regulator. This change in the frequency of the trigger signals causes a change in the quantity of energy which the switching regulator delivers to the output terminals so that the voltage at the output terminals returns to the original value.

When large amounts of current are required by a load connected across the output terminals, it may not be possible for a single switching regulator to deliver enough electrical energy to supply the required amounts of current. When this occurs, two or more switching regulators may each be connected to the voltage output terminals so that each of the switching regulators delivers electrical energy to an output filter capacitor connected across the output terminals. A separate pair of signal sources may be used to control the energy delivered by each of the switching regulators to the output filter capacitor. It is important that the signal sources all be synchronized so that the switching regulators are operated in tandem with first one regulator, then another regulator delivering electrical energy to the output filter capacitor. If all of the regulators deliver electrical energy at the same time, the voltage across the capacitor may vary and produce error signals in a load connected across the output terminals.

When a separate signal source is used to control each of the switching regulators, the frequency of the trigger signals from one signal source may be different than the frequency of the trigger signals from another signal source. This difference in frequency may cause one switching regulator to deliver a much larger amount of energy to the output filter capacitor than is delivered by another switching regulator. This can cause damage to the regulator delivering the larger amount of energy. Also, these signal sources are relatively expensive to construct. The present invention alleviates these disadvantages by providing a trigger circuit which produces tandem operation of two or more switching regulators. This trigger circuit senses current through a silicon controlled rectifier in a first switching regulator and develops a trigger pulse when current in this rectifier terminates. The trigger pulse is coupled to a silicon controlled rectifier in a second switching regulator causing the rectifier in the second switching regulator to fire. The frequency of the pulses which control the second switching regulator is the same as the frequency of the signals which control the first switching regulator so that each of these switching regulators delivers the same amount of energy to the output filter capacitor. The trigger circut provides accurate synchronization of the switching regulators and causes all of the switching regulators to share the load equally. In addition, the trigger circuit costs approximately 10% as much to construct as a separate signal source.

It is therefore an object of this invention to provide an improved trigger circuit which produces tandem operation of switching regulators.

Another object of this invention is to provide a trigger circuit which supplies trigger pulses to a second switching regulator when current to a first switching regulator terminates.

A further object of this invention is to provide an inexpensive trigger circuit to control the output current from a switching regulator.

A still further object of this invention is to provide a trigger circuit which provides trigger pulses which are accurately synchronized with the pulses of current provided by a switching regulator.

Still another object of this invention is to provide a trigger circuit which causes two or more switching regulators to provide substantially equal amounts of electrical energy to an output filter capacitor.

SUMMARY OF THE INVENTION

The foregoing objects are achieved in the instant invention by providing a new and improved trigger circuit which senses current through a first silicon controlled rectifier in a first switching regulator and supplies trigger pulses when current through the silicon controlled rectifier terminates. These trigger pulses cause a second silicon controlled rectifier in a second switching regulator to conduct. The first and second silicon controlled rectifiers are each rendered conductive the same number of times and cause the first and second switching regulators to each deliver substantially the same amount of electrical energy to an output filter capacitor.

Other objects and advantages of this invention will become apparent from the following description when taken in connection with the accompanying drawings.

BRIEF DESCRIPTION OF THE DRAWINGS

FIG. 1 is a schematic drawing of an embodiment of the instant invention;

FIGS. 2 and 3 illustrate magnetization curves which are useful in explaining the operation of the circuit shown in FIG. 1;

FIG. 4 illustrates waveforms which are useful in explaining the operation of the circuit shown in FIG. 1.

DESCRIPTION OF THE PREFERRED EMBODIMENT

Referring more particularly to the drawings by the characters of reference, FIG. 1 discloses a power supply system which is designed to provide a constant value of D.C. output voltage for a wide range of values of output current. As indicated in FIG. 1, the system comprises a pair of switching regulators 10 and 10a, a switching regulator control circuit 11 for providing trigger signals to switching regulator 10 and a pair of trigger circuits 12 and 12a for supplying trigger pulses to the switching regulator 10a. Trigger circuit 12 comprises a transformer 14 having a primary winding 15 and a secondary winding 16. The primary winding 15 is connected in the anode circuit of a silicon controlled rectifier 19 in switching regulator 10 so that the transformer senses the current through a silicon controlled rectifier 19 in switching regulator 10. The primary winding 15 may be a single turn of wire extending through the core of transformer 14. The secondary winding 16 is connected to the gate and cathode of a silicon controlled rectifier 20 in switching regulator 10a.

When current in silicon controlled rectifier 19 increases, a negative voltage is developed at the upper end of secondary winding 16 and a positive voltage at the lower end of secondary winding 16. A diode 22 connected across the secondary winding 16 controls the amplitude of the negative voltage applied between the gate and the cathode of the silicon controlled rectifier 20 in switching regulator 10a so that the silicon controlled rectifier is not damaged. A resistor 23 connected across the secondary winding 16 provides a load across this winding and prevents damage to the transformer 14 and to the diode 22 if an open circuit should occur between secondary windings 16 and silicon controlled rectifier 20. When the current through silicon controlled rectifier 19 in switching regulator 10 terminates, a positive voltage is developed at the upper end of secondary winding 16 and provides a trigger pulse which causes silicon controlled rectifier 20 to be rendered conductive. Trigger circuit 12 provides tandem firing of the silicon controlled rectifiers 19 and 20 so that current does not flow from positive terminal 25 of the high voltage D.C. power supply through silicon controlled rectifier 19 at the same time that current flows through silicon controlled rectifier 20. Thus, the peak current supplied from positive terminal 25 is much less than the current would be if silicon controlled rectifiers 19 and 20 were to both conduct at the same time.

In a similar manner trigger circuit 12a having a transformer 14a with a primary winding 15a and a secondary winding 16a senses the current through a silicon controlled rectifier 28 and provides a positive trigger pulse to a silicon controlled rectifier 29 when the current in silicon controlled rectifier 28 terminates. This causes current to flow through silicon controlled rectifier 29 when there is no current flowing through silicon controlled rectifier 28.

As indicated in FIG. 1, switching regulator 10 includes a transformer 31 comprising a primary winding 32 having a center tap and a pair of secondary windings 33 and 34. The primary winding is coupled to a high voltage D.C. power supply having a positive output terminal 25 and a negative output terminal 26. A pair of silicon controlled rectifiers 19 and 28 control the current supplied by the power supply to the primary winding of transformer 31. An anode 36 of silicon controlled rectifier 19 is connected through primary winding 15 to the positive terminal 25 of the high voltage power supply and the cathode 37 of silicon controlled rectifier 19 is connected to the upper end of the primary winding 31. Gate 38 of the silicon controlled rectifier 19 and cathode 37 are connected to a first signal source 42 which provides trigger signals to render rectifier 19 conductive. The anode 43 of silicon controlled rectifier 28 is connected through primary winding 15a to the lower end of primary winding 32 and cathode 44 of silicon controlled rectifier 28 is connected to the negative terminal 26 of the high voltage power supply. A second signal source 47 is connected between gate 45 and cathode 44 of silicon controlled rectifier 28 to provide trigger signals to render rectifier 28 conductive.

A saturable core employed in transformer 31 produces the magnetization characteristics illustrated in the magnetization curve of FIG. 2. The magnetizing force H is equal to the product of the number of turns of wire in a winding on the transformer core and the number of amperes of current for each turn of wire divided by the length of the core.

Since the physical length of a particular transformer core is constant, the magnetizing force of a transformer is often expressed as the number of amperes times the number of turns or "ampere-turns." The flux density B is the number of lines of flux per square centimeter of the transformer core and is determined by the value of the magnetizing force and the type of material used in the core. A discussion of the magnetization curves can be found in the textbook Magnetic Circuits and Transformers by E. E. Staff M.I.T., 1943, published by John Wiley & Sons, New York, N.Y.

A transformer having only a saturable core can be used in the circuits shown in FIG. 1, but the sudden change from a saturated condition to an unsaturated condition at points B and D of the magnetization curve of FIG. 2 causes the generation of electrical noise in the filter circuit. This noise can produce error signals in a data processing system which may be connected to the filter circuit. The horizontal portion of the magnetization curve between points A and B also causes the current in the primary winding 32 to increase very rapidly when silicon controlled rectifier 19 or silicon controlled rectifier 28 is rendered conductive. This rapid increase in current may cause damage to the silicon controlled rectifiers. The amount of noise generated can be greatly reduced and the rate of increase of current in the primary winding 32 can be reduced by using a transformer 31 having a saturable core and a linear core placed side by side with the primary winding extending completely about both cores. The magnetization curve for this combination of a saturable and a linear core is shown in FIG 3. This magnetization curve of FIG. 3 is very similar to the magnetization curve of FIG. 2 except that between points A and B the curve has an appreciable amount of slope instead of being almost horizontal as shown in the curve of FIG. 2.

A bias power supply 49 provides a current through an inductor 50 and bias secondary winding 33. Power supply 49 and secondary winding 33 are selected to provide a magnetizing force so that the saturable core is saturated and operating at point A of FIG. 3 when there is no current in the primary winding 32 of transformer 31.

The operation of the circuit of FIG. 1 will now be discussed in connection with the magnetization curve shown in FIG. 3 and the waveforms shown in FIG. 4.

A pair of capacitors 52 and 53 provide predetermined quantities of energy to the transformer 31 each time one of the silicon controlled rectifiers 19 and 28 is rendered conductive. Prior to time $t_1$ shown in FIG. 4, capacitor 52 of FIG. 1 is charged to the polarity shown in FIG. 1. At time $t_1$ a pulse from signal source 42 renders silicon controlled rectifier 19 conductive so that the voltage across capacitor 52 is applied to the upper half of primary winding 32 causing a current $I_1$ to flow from the upper plate of capacitor 52 through primary winding 15, from anode 36 through cathode 37, the upper half of primary winding 32 to the lower plate of capacitor 52. Current $I_1$ through primary winding 32 causes a change in the flux in the transformer core and causes the operating point to move from point A toward point B of the magnetization curve in FIG. 3. This change in flux produces a voltage across primary winding 32 which limits the rate of increase in current through silicon controlled rectifier 19 thereby preventing possible damage to rectifier 19. The operating point reaches point B when the ampere-turns in the primary winding 32 are approximately equal to the ampere-turns in the bias secondary winding 33. A positive voltage applied to the upper end of primary winding 32 causes the operating point to move upwards from point B toward point C. The distance between point B and point C is proportional to the product of the voltage applied to primary winding 32 and the duration of time this voltage is applied. The substantially vertical slope of the curve between point B and point C shows that there is substantially no change in the current in the primary winding 32 as the operating point moves from point B to point C.

The voltage applied to the upper half of the primary winding 32 is magnetically coupled through the transformer core to secondary windings 33 and 34. Between time $t_1$ and time $t_2$ secondary windings 33 and 34 each have a positive polarity of voltage at the lower end of the winding and a negative polarity of voltage at the upper end of the winding. This voltage across secondary winding 33 causes the current $I_4$ in inductor 50 to increase thereby storing energy in inductor 50. At the same time, the voltage across secondary winding 34 causes diode 55 to be back-biased so that no current flows through this diode or through secondary winding 34. Capacitor 52 provides current $I_1$ until this capacitor has discharged time $t_2$ as shown in waveform F of FIG. 4. The area M under the curve of waveform G (FIG. 4) between time $t_1$ and time $t_2$ is a sum of the products of the voltage applied to primary winding 32 and the duration of time the voltage is applied and this area M represents the total energy stored in inductor 50. When the voltage applied to primary winding 32 changes from a zero value at time $t_2$, the operating point moves from point C to point C'.

At time $t_2$, the energy stored in inductor 50 provides a current through transformer winding 33 which returns energy to the transformer and reverses the polarity of voltage across each of the transformer windings so that a negative polarity of voltage is developed at the upper end of primary winding 32. This negative polarity of voltage at the upper end of primary winding 32 causes the operating point in FIG. 3 to move from point C' toward point D. Again the distance between point C' and point D is proportional to the product of the voltage across primary winding 32 and the duration of time this voltage is applied. The area N under the curve of waveform G between times $t_2$ and $t_6$ is a sum of the products of the voltage across primary winding 32 and the time this voltage is applied and this area N represents the total energy which inductor 50 returns to the transformer. This voltage across primary winding 32 causes current $I_1$ to charge capacitor 52 to a polarity opposite to the polarity shown in FIG. 1.

As energy from inductor 50 is returned to the transformer, the voltage across secondary winding 34 increases to a value larger than the voltage shown across filter capacitor 57 so that a current $I_3$ flows through diode 55 to charge capacitor 57. The value of capacitor 57 is several times as large as the value of capacitor 52 so current $I_3$ causes very little change in the value of the voltage across capacitor 57. When current $I_3$ flows, this current through secondary winding 34 provides the flux which limits the rate of increase of the voltage across primary winding 32 so that current $I_1$ decreases below the holding current necessary to cause silicon controlled rectifier 19 to be conductive. Rectifier 19 is rendered nonconductive and the energy stored in inductor 50 is returned through the transformer to capacitors 57 and 58. When the currents in all of the transformer windings except secondary winding 33 decreases to a 0 value, the operating point of the magnetization curve shifts from point D back to point A.

The energy which is stored in the inductor when silicon controlled rectifier 19 conducts is proportional to the difference between the flux at point A and point C on the magnetization curve of FIG. 3; and the energy which is transferred from the inductor through the transformer to the output filter capacitor when silicon controlled rectifier 19 is rendered nonconductive is proportional to the difference between a flux at point C' and point A.

Since the distance between points A and C along the curve shown in FIG. 3 is substantially the same as the distance between points C' and A, substantially all the energy which was stored in inductor 50 between times $t_1$ and $t_2$ is returned through the transformer between times $t_3$ and $t_6$ and is stored in capacitors 57 and 58. Capacitor 52 delivers substantially the same amount of energy to the transformer each time the silicon controlled rectifier 19 is rendered conductive so that the amount of energy delivered to filter capacitors 57 and 58 and the voltage across these capacitors is determined by the frequency of the signals applied to gate 38 of rectifier 19.

Capacitor 53 also provides a predetermined quantity of energy to the transformer each time silicon controlled rectifier 28 is rendered conductive. Prior to time $t_8$, capacitor 53 is charged to the polarity shown in FIG. 1. At time $t_8$, a pulse from signal source 47 renders silicon controlled rectifier 28 conductive so that a current $I_2$ flows from the upper plate of capacitor 53 through the lower half of primary winding 32, winding 15a of transformer 14a, anode 43 and cathode 44 to the lower plate of capacitor 53. Current $I_2$ through the lower half or primary winding 32 and the voltages impressed across this winding cause the operating point of the characteristic curve in FIG. 3 to move from point A to point C and cause an increase in current $I_4$ to store a predetermined amount of energy in inductor 50. When silicon controlled rectifier 28 is rendered nonconductive, this energy is returned through the transformer 31, and a current $I_3$ charges capacitor 57 as described above.

The amount of voltage across capacitors 57 and 58 can be controlled by controlling the frequency of the trigger signals which signal sources 42 and 47 apply to the gates of silicon controlled rectifiers 19 and 28. The frequency of the trigger signals is determined by the value of voltage applied to the control terminal 60. When an increase in the amount of current drawn by a load (not shown) connected across the output terminals 62 and 63 in FIG. 1 causes the value of voltage at control terminal 60 to fall below a predetermined reference level, the frequency of the output signals from signal sources 42 and 47 increases. This increase in the frequency of the output signals causes an increase in the rate of energy delivered to the filter capacitors 57 and 58 and increases the voltage at control terminal 60 to the predetermined reference level. The voltage at output terminal 62 of the power supply controls the frequency of the signals from signal sources 42 and 47 so that the voltages at the output terminals 52 and 63 is substantially constant even when the current drawn from this power supply varies over a wide range of values.

Trigger circuits 12 and 12a provide trigger pulses to silicon controlled rectifiers 20 and 29 so that switching regulator 10a delivers electrical energy to filter capacitor 57 in the same manner as switching regulator 10. At time $t_1$ current $L_1$ through primary winding 15 of transformer 14 produces a negative polarity of voltage at the upper end of secondary winding 16 and a positive polarity of voltage at the lower end of secondary winding 16. The voltage from the upper end of the winding is shown in waveform C of FIG. 4. Diode 22 limits the amplitude of the negative voltage at the gate of silicon controlled rectifier 20 to prevent damage to the rectifier between time $t_1$ and time $t_2$ (FIG. 4).

At time $t_3$ the current through pirmary winding 15 and silicon controlled rectifier 19 terminates producing a positive polarity of voltage at the upper end of secondary winding 16 and causing silicon controlled rectifier 20 in switching regulator 10a to be rendered conductive. Capacitor 52a provides a predetermined quantity of energy to transformer 31a each time silicon controlled rectifier 20 is rendered conductive. This energy is transferred to inductor 50a in the manner described above. When the energy is returned from the inductor to transformer 31a, a current $I_{3a}$ through secondary winding 34a and diode 55a supplies a charge to capacitor 57 between time $t_4$ and time $t_8$ as shown in waveform S of FIG. 4. Silicon controlled rectifier 19 conducts between times $t_1$ and $t_3$ while silicon controlled rectifier 20 conducts between times $t_3$ and $t_4$.

If switching regulators 10 and 10a cannot supply sufficient electrical power to a load (not shown) across output terminals 62 and 63, another switching regulator can be connected to transformers 14b and 14c shown near silicon controlled rectifiers 20 and 29, respectively. If another switching regulator is not needed, transformers 14b and 14c can be removed from the circuit and the anode of rectifier 20 can be connected directly to positive terminal 25 of the power supply. The anode of rectifier 29 can be connected directly to the lower end of primary winding 32a of transformer 31a.

I claim:

1. A trigger circuit for providing tandem operation of switching regulators for use with first and second switching regulators each having a silicon controlled rectifier and a pair of input control terminals, said circuit comprising: a transformer having a primary winding and a secondary winding, said primary winding being connected to sense current through said rectifier in said first switching regulator, said secondary winding being connected to said pair of input control terminals of said second switching regulator; first and second output terminals, said first and said second switching regulators each being connected to said first and second output terminals; a capacitor, said capacitor being connected between said first and said second output terminals, said first switching regulator delivering current to said capacitor in response to current through said rectifier in said first switching regulator, said transformer providing trigger pulses to said input control terminals of said second switching regulator in response to a change in current through said rectifier in said first switching regulator, said trigger pulses causing said second switching regulator to deliver substantially the same amount and same polarity of current to said capacitor as delivered by said first switching regulator; and a diode, said diode being connected between a first end and a second end of said secondary winding.

2. A trigger circuit for providing tandem operation of said switching regulators for use with first and second switching regulators each including a silicon controlled rectifier having a gate, a cathode and an anode, said circuit comprising: a transformer having a primary winding and a secondary winding, said primary winding being connected to sense the current through said rectifier in said first switching regulator; first and second output terminals; a capacitor, said capacitor being connected between said first and said second output terminals, said first and said second switching regulators each being connected to said first and said second output terminals, said first switching regulator delivering current to said capacitor in response to current through said rectifier in said first switching regulator; a diode, said diode being connected between a first and a second end of said secondary winding, said first end of said secondary winding being connected to said gate of said silicon controlled rectifier in said second regulator, said second end of said secondary winding being connected to said cathode of said rectifier in said second regulator so that said transformer provides a trigger pulse to render said rectifier in said second regulator conductive when current through said rectifier in said first regulator terminates, said trigger pulses causing said second switching regulator to deliver substantially the same amount and the same polarity of current to said capacitor as delivered by said first switching regulator to said capacitor.

3. Apparatus for providing a regulated D.C. voltage for use with a power supply having a positive terminal and a negative terminal, said apparatus comprising: first and second switching regulators each including a silicon controlled rectifier having a gate, a cathode and an anode; means for applying trigger signals to said gate of said rectifier in said first regulator; first and second output terminals, said first and said second switching regulators each being connected to said first and second output terminals; a capacitor, said capacitor being connected between said first and said second output terminals, said first switching regulator delivering current to said capacitor in response to current through said rectifier in said first switching regulator; a transformer having a primary winding and a secondary winding, said primary winding being connected to sense current through said rectifier in said first regulator; and a diode, said diode being connected between a first end and a second end of said secondary winding, said secondary winding being connected between said gate and said cathode of said rectifier in said second regulator, said transformer providing a trigger pulse to render said rectifier in said second regulator conductive when current through said rectifier terminates, said trigger pulse causing said second switching regulator to deliver substantially the same amount and same polarity of current to said capacitor as delivered by said first switching regulator.

References Cited
UNITED STATES PATENTS

| 3,250,978 | 5/1966 | Moscardi | 323—22 X |
| 3,284,690 | 11/1966 | Naber | 307—223 X |
| 3,290,514 | 12/1966 | Haskovec et al. | 307—252 |
| 3,319,152 | 5/1967 | Pinckaers. | |

LEE T. HIX, Primary Examiner

A. D. PELLINEN, Assistant Examiner

U.S. Cl. X.R.

321—2; 323—25, 38